United States Patent [19]
Trutor et al.

[11] 3,921,725
[45] Nov. 25, 1975

[54] COMBINATION TOOL FOR HUSBANDRY PURPOSES

[76] Inventors: John Trutor, Benson, Vt. 05731;
Karl F. Kovacs, 5110 New Perry Highway, Erie, Pa. 16509

[22] Filed: Dec. 13, 1973

[21] Appl. No.: 426,715

[52] U.S. Cl. .................. 172/375; 7/1 L; 56/400.04;
172/374; 172/378; 294/51; 294/55.5; 294/59
[51] Int. Cl.² ... A01B 1/04; A01B 1/20; A01B 1/22; A01D 9/02
[58] Field of Search ............................ 172/371–381;
56/400.04–400.07; 294/51, 52, 55.5, 59;
24/274 R; 7/1 L

[56] References Cited
UNITED STATES PATENTS

| | | | |
|---|---|---|---|
| 199,481 | 1/1878 | Thomas | 172/375 |
| 291,504 | 1/1884 | Gates | 172/375 |
| 329,046 | 10/1885 | Jincks | 172/375 |
| 635,949 | 10/1899 | Willman | 172/375 |
| 801,978 | 10/1905 | Garner | 172/375 |
| 870,955 | 11/1907 | Hazzard | 294/52 X |
| 1,165,636 | 12/1915 | Temte | 56/400.05 X |
| 1,185,426 | 5/1916 | Miller et al. | 294/52 |
| 1,187,222 | 6/1916 | Young | 172/375 |
| 1,244,437 | 10/1917 | Fisher | 294/51 |
| 1,328,191 | 1/1920 | Peterson | 172/373 |
| 1,632,260 | 6/1927 | Woodall | 172/375 |
| 3,604,074 | 9/1971 | Bambas | 24/274 R |

FOREIGN PATENTS OR APPLICATIONS 296,047    2/1915    Germany ............................ 172/375

*Primary Examiner*—Edgar S. Burr
*Assistant Examiner*—Steven A. Bratlie

[57] ABSTRACT

A combination tool for various husbandry purposes, wherein both a hoe and a fork is desirable. The hoe incorporates tines attached to the shank by which the hoe is attached to the hoe handle.

2 Claims, 4 Drawing Figures

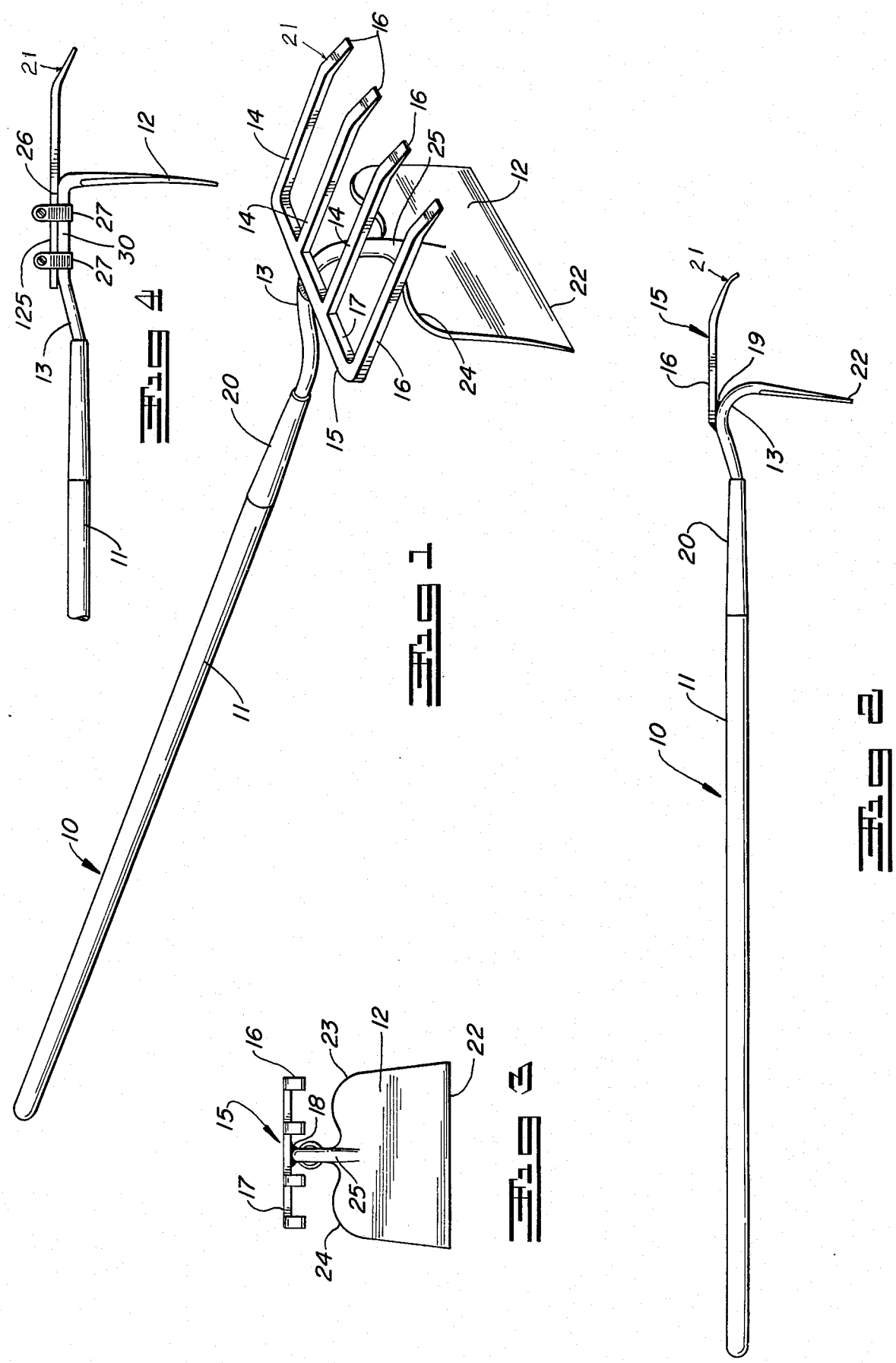

COMBINATION TOOL FOR HUSBANDRY PURPOSES

GENERAL STATEMENT OF INVENTION

In the process of hoeing the soil, it is often desirable to be able to effect certain results which the so-called "garden" hoe (including the so-called nursery, cultivator, Warren, scuffle, and weeding hoe types) are incapable of, or limited in, achieving. Our invention provides a greater range of uses for the hoe without the necessity of changing from one implement to another and with a reduction in effort, such as stooping, kneeling, and picking up objects by hand. More specifically, because of our invention's physical conformation, we provide augmentative husbandry capabilities directionally, contactually, and mobilely in ways not possible to, or more effectively than, those inherent in said hoe.

These added capabilities will effectuated for most uses by simply inverting the usual operational position of the hoe blade 180°, thus positioning our device for the more effective accomplishment of activities such as removing winter mulches; penetrating and pulverizing the soil in preparation for seeding and transplanting; unearthing, picking up, and casting aside undesired matter such as stones, rubbish, and weeds; aerating the soil around plant roots; harvesting below-surface vegetables and flower bulbs; and harvesting such of the larger above-surface vegetables as tomatoes, cantaloupe, and squash.

REFERENCE TO PRIOR ART

Previous combination tools of the general type disclosed herein are shown in U.S. Pat. Nos. 1,174,804, 1,661,954, 1,665,183, 2,592,990, and 2,637,261. The tool disclosed herein has certain advantages over those shown in the said prior art patents which will appear later herein.

OBJECTS OF THE INVENTION

It is an object of the invention to provide an improved combination tool for husbandry use.

Another object of the invention is to provide an improved combination hoe and spading fork.

Another object of the invention is to provide an improved combination tool.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is an isometric view of the tool according to the invention.

FIG. 2 is a side view of the tool according to the invention.

FIG. 3 is an end view of the tool.

FIG. 4 is a side view of another embodiment of the invention.

DETAILED DESCRIPTION OF THE DRAWINGS

The tool disclosed herein is indicated generally at 10 and shows a handle 11 fixed to blade 12 by means of a tang 13. The tang curves upwardly from the blade 12 and then generally at a right angle to the blade at 19 and is attached to the blade by a suitable socket 20 in the usual manner, or it could be attached by any other well known attaching means. The upper edges of the hoe are curved at 23 and 24 in the usual manner, and the tang 13 is integrally attached to the hoe at 25. The fork 15 has tines 16 that are integrally attached to the cross bar portion 17. The cross member portion 17 is fixed to the tang 13 at 18 by welding or other well known fastening means. The shank and the tines 16 may be manufactured integral with the tang by a single process. The tines 16 extend at an angle of approximately 110° to the blade 12 of the hoe. The hoe has a cutting edge indicated at 22 and the tines 16 are tapered at 21 so that they readily penetrate the soil. The ends of the tines may be bevelled and curved as shown at an angle of 20° for example. The tines 16 may be attached to the tang 13 of the hoe by means of one or more clamping devices commonly available on the commercial market, such as U-bolt or worm-drive hose clamp.

An example of the dimensions of the hoe would be, the blade would be 4 inches long from the tang to the cutting edge. The tines may be spaced, for example, about 1 inch apart on the center throughout their length and may be integrally connected by a forged steel cross member 17 which is disposed at right angles to the tines and may be of the same dimensions and made of the same material as the tines.

In the embodiment of FIG. 4 the tool has a handle 11 fixed to blade 12 by means of tang 13 as in the embodiment of FIG. 1. The tang has a straight part 30 on which is attached base member 125. Cross member 17 is integrally attached to base member 125 at 26. Base member 125 rests on tang 13 and is clamped to the straight portion 30 of tang 13 by clamps 27 which may be worm-driven clamps.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A combination tool for use in husbandry comprising a hoe and a plurality of removably mounted parallel tines, said hoe having a platelike blade, a cross member mounting said tines, said tines having one end integrally fixed to said cross member and extending generally perpendicular to said cross member, said cross member including a base member having one end integrally fixed to said cross member on the side of said cross member opposite said tines and extending from said cross member in a direction opposite said tines and generally in alignment with said tines, a tang and a handle, said tang having a first generally straight flat part fixed to said hoe blade, a second straight part and a curved part connecting said second straight part to said first straight part, said second straight part being fixed to said handle and disposed at an obtuse angle to said handle, said base member being generally flat and resulting adjacently above said first straight flat part of said tang and disposed generally parallel thereto, said tines extending above and forming an angle of approximately 110° relative to said platelike blade, and spaced clamp members extending around said base member and around said first straight flat part of said tang clamping said base member to said tang, said tines having a generally straight elongated part adjacent said cross member extending to a tapered distal end, the distal end of each of said tines being tapered downwardly toward said platelike blade at approximately 20° relative to said straight part of said tines to a substantially sharp edge.

2. The tool recited in claim 1 wherein said clamps have worm drive clamping means.

* * * * *